G. C. GUMM.
BAKING UTENSIL.
APPLICATION FILED MAY 24, 1913.
1,106,042.
Patented Aug. 4, 1914.
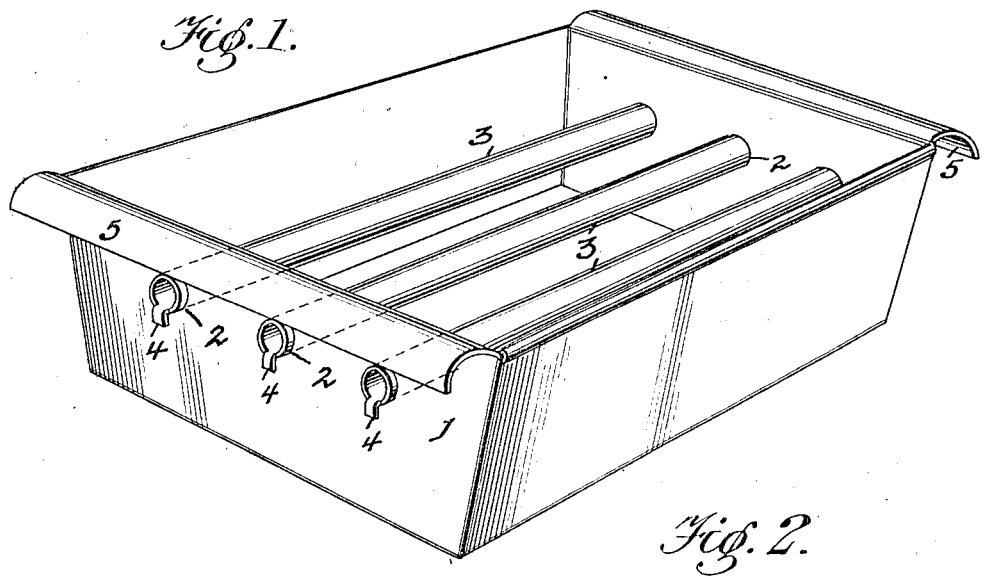
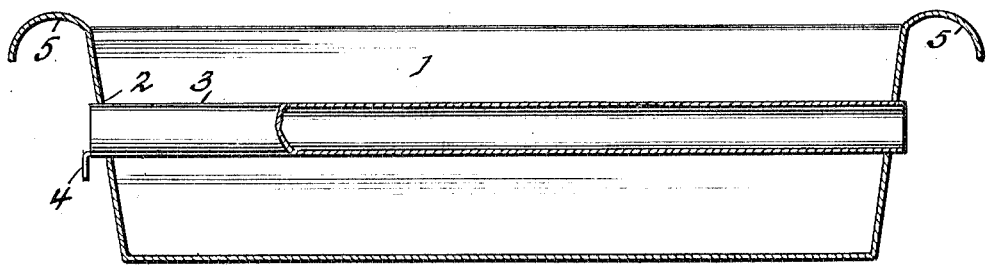
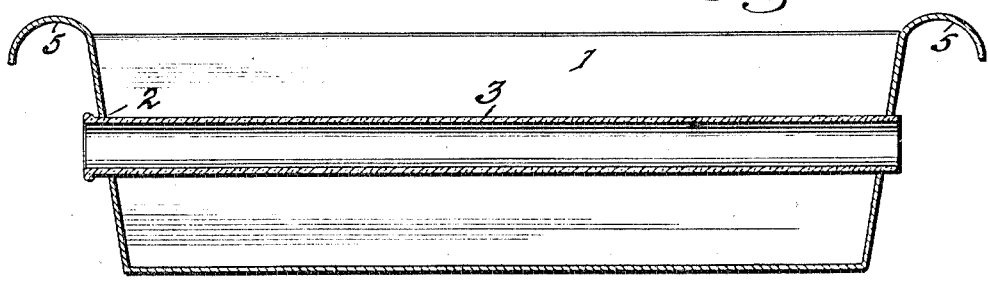
Witnesses
Geo. Ackman Jr.
S. W. Magruder.
Inventor
George C. Gumm,
by Gould & Gould
Attorneys

UNITED STATES PATENT OFFICE.

GEORGE C. GUMM, OF WASHINGTON, DISTRICT OF COLUMBIA.

BAKING UTENSIL.

1,106,042.     Specification of Letters Patent.     Patented Aug. 4, 1914.

Application filed May 24, 1913. Serial No. 769,674.

*To all whom it may concern:*

Be it known that I, GEORGE C. GUMM, a citizen of the United States, residing at Washington, District of Columbia, have invented certain new and useful Improvements in Baking Utensils, of which the following is a specification.

This invention relates generally to bake pans, being directed particularly to the provision of a pan wherein the interior of the material being baked is afforded an equal degree of heat with those portions of the material lying adjacent to the walls and bottom of said pan incidentally resulting in an even baking throughout the material being baked.

The main object of the present invention is the provision of a structure in the use of which time and fuel are saved in the incidental use of the pan in the baking operation.

Another object of the invention is to produce a bake pan in the use of which a cake or loaf of bread being baked is positively prevented from falling or becoming "sad."

The salient features of this invention reside in a series of removable tubes of conduits disposed between and supported by the walls of the pan for the purpose of conducting heat of the oven into the interior of the mass being baked; another important feature resides in means, in arresting and directing in its upward movement the heat of the oven into said conduits.

The invention will now be described in the following specification, taken in connection with the accompanying drawing, forming a part thereof, and then more particularly pointed out in the appended claims.

Figure 1 is a perspective view of the improved pan. Fig. 2 is a longitudinal section of the same, one of the tubes being shown partly in elevation. Fig. 3 is a longitudinal section through the pan, a slightly modified form of tube being shown.

Referring now to the drawings, wherein the preferred details of my invention are illustrated, and wherein like characters of reference indicate like parts throughout the several views, 1 denotes a bake pan essentially similar in construction and material to the ordinary bake pan in most particulars. Disposed in horizontal alinement in either end wall of the bake pan 1 is a series of apertures 2 designed to support each respectively a tube or conduit 3 of appropriate length and material. It is designed primarily to construct these tubes either of aluminum or tin, in the latter instance the material being coated of course with some non-corroding material. If preferred, the tubes may in conformity of sanitary principles, be formed of glass as shown in Fig. 3, the latter material being readily kept clean and free from deleterious particles. Formed on the end of each tube is a finger clip 4, depending from the lower lip of the tube, and forming a means to accomplish the ready withdrawal of the tube when desired.

Formed integrally with or appropriately joined to the upper edge of the end walls of the pan, as may be preferred, are deflecting hoods 5. These hoods are concaved and outlined and extend an appropriate distance beyond the ends of the conduits 3 when the latter are in operative position in the bake pan, and are designed to arrest and direct into the ends of said conduits the upward currents of air from the bottom of the oven, and also serve as a handle for the pan. These hoods 5 form an essential feature of this invention as they are the means of accomplishing one of the functions for which the invention is primarily intended, namely, the saving of time and fuel in the baking of the material being cooked. This result is brought about as follows: It is well known that currents of heat naturally tend toward the top of any structure wherein generated. These hoods 5, due to their concave form and position above the open ends of the conduits 3 arrest and direct said currents into said open ends said currents otherwise escaping above the bake pan and their efficiency lost. A larger amount of heated air will therefore more quickly be introduced for use, through the meeting of conduits 5, into the interior of the material being baked than would result in the use of the pan without the hoods.

In operation, the tubes or conduits 3 are removed from the pan and greased in similar fashion to the interior thereof. They are then placed in operative position and the cake or bread dough placed in the pan in usual manner and completely surrounding the tubes, which while ordinarily disposed approximately centrally of the pan may be positioned in appropriate situation in accordance with the depth of the pan or the nature of the dough being baked. The conduits 3 may also vary in size in different pans in accordance with the consistency of material being baked. The material to be baked being placed within the pan the same is, as usual, placed in the heated oven, experience demonstrating the required time necessary to thoroughly bake the material with this apparatus.

What is claimed is:—

1. A bake pan having end walls and an open-ended tube removably mounted in said end walls, said tube bridging the space between the end walls.

2. A bake pan having opposing walls, a tube open at the ends removably mounted in said opposing walls, the main length of the tube being disposed wholly within the interior of the pan.

3. A bake pan having opposing walls formed with openings, a tube open at the ends and removably mounted in said openings and closed against the interior of the pan.

4. In a bake pan having end walls, a series of heat conducting tubes open at the ends and mounted in said walls, and hoods formed on the end walls of the pan above and beyond the tubes for arresting and directing heat through said tubes.

5. A bake pan including opposing walls, a tube open at the ends and movably mounted in said walls and extending between them, and means carried by the tube to limit movement thereof in one direction with relation to the walls.

6. A bake pan including opposing walls, one of said walls having its upper portion provided with a relatively outstanding directing hood, and a tube open at the ends and removably mounted in the walls below the hood.

In testimony whereof, I affix my signature in presence of two witnesses.

GEORGE C. GUMM.

Witnesses:
 HARRY L. GOULD,
 BENNETT S. JONES.